United States Patent
Sun et al.

(10) Patent No.: US 12,241,722 B2
(45) Date of Patent: Mar. 4, 2025

(54) MICRO GUNSIGHT, SMALL LASER, FINE-TUNING SPRING, LASER SIGHT DEVICE INNER CORE, RESET PIN, AND LASER SIGHT DEVICE

(71) Applicant: HUANIC CORPORATION, Shaanxi (CN)

(72) Inventors: Jianhua Sun, Shaanxi (CN); Meng Zhao, Shaanxi (CN); Yingzi Yang, Shaanxi (CN); Dong Wang, Shaanxi (CN)

(73) Assignee: HUANIC CORPORATION, Shaanxi (CN)

( * ) Notice: Subject to any disclaimer, the term of this patent is extended or adjusted under 35 U.S.C. 154(b) by 0 days.

(21) Appl. No.: 17/624,307

(22) PCT Filed: Dec. 31, 2019

(86) PCT No.: PCT/CN2019/130409
§ 371 (c)(1),
(2) Date: Dec. 31, 2021

(87) PCT Pub. No.: WO2021/077619
PCT Pub. Date: Apr. 29, 2021

(65) Prior Publication Data
US 2022/0357127 A1 Nov. 10, 2022

(30) Foreign Application Priority Data

Oct. 21, 2019 (CN) .......................... 201911000856.8
Nov. 19, 2019 (CN) .......................... 201911136786.9
Nov. 19, 2019 (CN) .......................... 201911136808.1

(51) Int. Cl.
*F41G 1/35* (2006.01)
*F41G 11/00* (2006.01)
*G02B 27/20* (2006.01)

(52) U.S. Cl.
CPC .............. *F41G 1/35* (2013.01); *F41G 11/003* (2013.01); *G02B 27/20* (2013.01)

(58) Field of Classification Search
CPC . F41G 1/35; F41G 1/36; F41G 11/003; G02B 27/20
See application file for complete search history.

(56) References Cited

U.S. PATENT DOCUMENTS 4,916,713 A * 4/1990 Gerber .................. G01S 7/4813
372/109
5,515,636 A * 5/1996 McGarry ................ F41A 35/06
42/117

(Continued)

FOREIGN PATENT DOCUMENTS

| CN | 2369256 Y | 3/2000 |
| CN | 201122077 Y | 9/2008 |

(Continued)

OTHER PUBLICATIONS

English translation of Office Action regarding corresponding JP App. No. 2021-577953; issued Oct. 4, 2022.

(Continued)

*Primary Examiner* — Michelle Clement
(74) *Attorney, Agent, or Firm* — Dickinson Wright PLLC

(57) ABSTRACT

The disclosure relates to a micro gunsight, a small laser, a fine-tuning spring, a laser sight device inner core, a reset pin and a laser sight device. which includes a mounting slot that is matched with the gun card track. The mounting slot is composed of a fixed rail and a movable rail. The mounting slot is provided with a gunsight body, and inside the gunsight body is provided with a laser fine-tuning seat. A dual-light laser is installed inside the laser fine-tuning seat, and a fine-tuning mechanism is installed in the laser fine-tuning seat. There are multiple adapters at the bottom of the gunsight body, which are suitable for different Picatinny (Continued)

rails, making the installation position closer to the trigger guard, convenient for users to operate, and avoiding the problem of easy loosening of the front and rear positions of the sight device.

9 Claims, 11 Drawing Sheets

(56) References Cited

U.S. PATENT DOCUMENTS

| | | | |
|---|---|---|---|
| 5,584,137 A | 12/1996 | Teetzel | |
| 5,584,569 A * | 12/1996 | Huang | F41G 1/545 |
| | | | 362/288 |
| 6,295,753 B1 | 10/2001 | Thummel | |
| 7,014,369 B2 * | 3/2006 | Alcock | G02B 6/3874 |
| | | | 385/11 |
| 7,331,137 B2 * | 2/2008 | Hsu | F41G 11/003 |
| | | | 42/114 |
| 7,726,061 B1 * | 6/2010 | Thummel | F41G 1/35 |
| | | | 42/117 |
| 7,765,731 B1 | 8/2010 | Liebig | |
| 8,230,636 B1 | 7/2012 | Swan | |
| 9,062,933 B1 * | 6/2015 | Allen | F21V 21/34 |
| 9,080,836 B1 | 7/2015 | Williford | |
| 9,297,614 B2 * | 3/2016 | Moore | F41G 1/35 |
| 9,658,031 B1 * | 5/2017 | Hedeen | F41C 33/0263 |
| 9,927,209 B2 * | 3/2018 | Sharrah | F21V 33/008 |
| 10,001,343 B2 * | 6/2018 | Zeisler | H05B 45/44 |
| 10,048,040 B1 | 8/2018 | Ratliff | |
| 10,107,592 B1 * | 10/2018 | Huang | F41G 11/003 |
| 10,161,716 B2 * | 12/2018 | Tuller | F41G 1/35 |
| 10,222,171 B2 * | 3/2019 | Chavez | F41G 1/35 |
| 10,234,238 B1 * | 3/2019 | Thomas | F41G 3/08 |
| 10,365,069 B1 * | 7/2019 | Tayon | F41G 11/003 |
| 10,612,761 B1 * | 4/2020 | Worman | F21V 19/004 |
| 10,782,100 B2 * | 9/2020 | Bigby | F41G 1/36 |
| 10,845,157 B2 * | 11/2020 | Chavez | F41C 23/16 |
| 10,969,198 B2 * | 4/2021 | Chavez | F41G 1/033 |
| 11,506,366 B2 * | 11/2022 | Sharrah | F41G 11/003 |
| 11,608,970 B2 * | 3/2023 | Jiang | F41G 1/35 |
| 11,629,935 B2 * | 4/2023 | Bigby | F41G 11/001 |
| | | | 42/117 |
| 2010/0091485 A1 * | 4/2010 | Matthews | F21V 14/065 |
| | | | 362/234 |
| 2015/0276352 A1 * | 10/2015 | Chang | F41G 11/003 |
| | | | 42/114 |
| 2017/0082399 A1 * | 3/2017 | Moore | F41G 1/36 |
| 2017/0341257 A1 | 11/2017 | Teetzel | |
| 2018/0156569 A1 | 6/2018 | Chavez | |
| 2021/0320472 A1 * | 10/2021 | Bowman | F41G 1/00 |
| 2022/0244017 A1 * | 8/2022 | Ripplinger | F41G 3/065 |
| 2023/0116723 A1 * | 4/2023 | Tseng | H01S 5/4012 |
| | | | 372/20 |

FOREIGN PATENT DOCUMENTS

| | | |
|---|---|---|
| CN | 201575031 U | 9/2010 |
| CN | 102588418 A | 7/2012 |
| CN | 202929287 U | 5/2013 |
| CN | 104712917 A | 6/2015 |
| CN | 205262296 U | 5/2016 |
| CN | 107667272 A | 2/2018 |
| CN | 207881567 U | 9/2018 |
| CN | 207882567 U | 9/2018 |
| CN | 109026962 A | 12/2018 |
| CN | 208349932 U | 1/2019 |
| CN | 209485150 U | 10/2019 |
| CN | 211480500 U | 9/2020 |
| CN | 212431928 U | 1/2021 |
| JP | 2003232327 A | 8/2003 |
| JP | 2019095121 A | 6/2019 |

OTHER PUBLICATIONS

International Search Report regarding PCT/CN2019/130409; mailed Jul. 27, 2020.
Extended European Search Report regarding corresponding EP App. No. 19949757.9; issued Mar. 19, 2024.
First Office Action dated Jun. 29, 2024 corresponding to Chinese Application No. 201911136786.9, 13 pages.
Notice of Grant dated Oct. 10, 2024 corresponding to Chinese Patent No. 201911000856.8, 5 pages.

* cited by examiner

MICRO GUNSIGHT, SMALL LASER, FINE-TUNING SPRING, LASER SIGHT DEVICE INNER CORE, RESET PIN, AND LASER SIGHT DEVICE

CROSS-REFERENCE TO RELATED APPLICATIONS

The present application claims the priority to the Chinese patent applications NO. 201911000856.8, filed on Oct. 21, 2019, NO. 201911136786.9, filed on Nov. 19, 2019, NO. 201911136808.1, filed on Nov. 19, 2019, which are incorporated herein by reference in their entirety.

TECHNICAL FIELD

The disclosure belongs to the technical field of attachments for light weapons, and specifically relates to a micro gunsight, a small laser, a fine-tuning spring, a laser sight device inner core, a reset pin and a laser sight device.

BACKGROUND

A laser is a device that can emit laser light. The quality of the light emitted by the laser is pure and the spectrum is stable. It can be used in many ways. With the advancement of science and technology, there are more and more types of lasers. In some applications, the requirements for the position accuracy of laser emission are also getting higher and higher. Especially the application of lasers in light weapons requires higher accuracy of lasers.

The existing dual-light laser is fine-tuned through the fine-tuning seat at the bottom of the laser, which occupies a large space and is costly. Moreover, the fine-tuning screw has a thread gap, which is likely to have a certain error in the fine-tuning process, the accuracy is not easy to control, and the effect of high-precision fine-tuning cannot be achieved, and it is not suitable for application in the field of light weapons technology. Moreover, the existing laser sight device is installed in the Picatinny rail of the gunsight device through a fixed rail and a movable rail. Due to the large vibration and impact of the gun during use, there is a problem that the front and rear positions of the laser sight device are easy to loosen.

As shown in FIGS. 7 and 8, the angle adjustment of the emitted light of the existing laser sight device or laser mainly relies on the laser module 14 (the rear end is a spherical surface, and cooperate with the limit pin 20 inserted perpendicularly to the rear end of the housing 13 and the spherical surface of the inner side wall of the rear end of the housing 13 to form an adjustment basis) in the housing 13, the horizontal adjustment screw 16, the horizontal guide limit post 17, the horizontal fine-tuning spring 18, the vertical adjustment screw 23, the vertical limit post, the vertical fine-tuning spring, which are vertically arranged at the front end of the housing 13 on the side of the light exit hole to adjust the left and right angle or the elevation angle of the laser module 14. However, in practical applications, vibration often occurs, which causes the horizontal adjustment screw 17 or the vertical adjustment screw 23 to loosen, thereby affecting the stability of the angle adjustment, and thus the shooting accuracy.

In addition, the existing protective glass 15 arranged in the end cover 29 is generally installed vertically, that is, the laser light is incident on the protective glass 15 vertically, often the power of the laser module is unstable due to the reflected light returning along the incident light, which causes the brightness of the emitted laser to be unstable, and also affects the shooting accuracy and service life.

The adjustment of the direction of the emitted light of the existing laser pointer, laser sight, optical sight and other optical instruments mainly relies on the horizontal adjustment screw and the vertical adjustment screw installed on the housing, to realize the adjustment of the left and right angle or the up and down angle of the optical instrument body, so as to realize the adjustment of the angle of the emitted light. However, this structure is generally suitable for larger sight devices, and not suitable for optical instruments that are small in size and require high adjustment accuracy, that is, to fine-tune the angle, mainly because the structure is complex and the adjustment takes up a lot of space; And the existing laser sight device needs to be adjusted by two screws.

SUMMARY

The technical solution adopted by the present disclosure is a fine-tuning micro gunsight with multiple types of adapters, which includes a mounting slot that is matched with the gun card track. The mounting slot is composed of a fixed rail and a movable rail. The mounting slot is provided with a gunsight body, and inside the gunsight body is provided with a laser fine-tuning seat. A dual-light laser is installed inside the laser fine-tuning seat, and a fine-tuning mechanism is installed in the laser fine-tuning seat.

Multiple types of adapters can be installed at the bottom of the gunsight body, and the multiple types of adapters are used in conjunction with the installation of different firearm rails.

On the one hand, the dual-light laser is fine-tuned through the fine-tuning mechanism to eliminate the error caused by the thread gap and achieve the effect of high-precision fine-tuning of the laser; On the other hand, the adapter is provided at the bottom of the gunsight body to install the present device on the Picatinny rail of the firearm, so as to avoid the problem of easy loosening of the front and rear positions of the sight device during vibration and impact of the firearm.

Preferably, the laser fine-tuning seat includes a fine-tuning member arranged on the outer periphery of the dual-light laser, the front end of the inner cavity of the fine-tuning member is the light-emitting end of the dual-light laser, the front end of the fine-tuning member is provided with a protective glass, and the rear end of the fine-tuning member is provided with a back cover;

The fine-tuning mechanism includes a first fine-tuning hole, a second fine-tuning hole, a third fine-tuning hole, and a fourth fine-tuning hole evenly arranged on the same cross-section of the fine-tuning member. The first fine-tuning hole is arranged opposite to the third fine-tuning hole, and the second fine-tuning hole is arranged opposite to the fourth fine-tuning hole. The first fine-tuning hole and the second fine-tuning hole are threaded holes, and are respectively provided with a fine-tuning screw; the third fine-tuning hole and fourth fine-tuning hole are blind holes, and a guide post is provided inside, and a return spring is provided on the outside of the guide post;

The side surfaces of the first fine-tuning hole and the second fine-tuning hole are respectively provided with a damping hole obliquely penetrated therethrough. The damping hole is provided with a damping column which is in contact with the fine-tuning screw.

The laser is fine-tuned through the fine-tuning screw and the return spring, and then the error caused by the thread gap is eliminated through the damping column to achieve the effect of high-precision fine-tuning of the laser;

Preferably, the dual-light laser includes two laser tubes, the laser tubes are coaxially installed in the coaxial housing, the light-emitting end of the laser tube is provided with a focusing lens, and the outer periphery of the coaxial housing is provided with a fine-tuning housing.

The application of dual-light laser tubes in light weapons makes light weapons more accurate and more flexible.

Preferably, the light-emitting end of the fine-tuning housing is set as a rectangle, and the four sides of the rectangle are respectively arranged perpendicularly to the four fine-tuning holes of the fine-tuning member.

Setting the cross section of the light-emitting surface of the dual-light laser to be rectangular makes it easier for the four fine-tuning holes to fine-tune the dual-light laser, and the four fine-tuning holes are arranged perpendicular to the four cross-sections of the rectangular, making the fine-tuning more accurate and easy to operate.

Preferably, a lens holder is provided on the outer periphery of the protective glass, and the protective glass is arranged obliquely.

The lens holder enables the protective glass in a safe working state. The protective glass is arranged obliquely, and the protective glass is inclined at a certain angle to prevent the laser light from being reflected back to the laser tube in the original way and causing the power of the dual-light laser to be unstable.

Preferably, the back cover is a spring back cover, and the spring is an L-shaped spring. The rear periphery of the fine-tuning member is provided with bump. The L-shaped spring is clamped with the bump, and the back cover is provided with a laser drive plate;

The back cover makes the fine-tuning member dustproof and improves the precision, and the L-shaped spring also makes the opening and closing of the back cover more flexible.

Preferably, the damping column and the damping hole are a transition fit.

The tight fit makes the damping column not easy to fall off, and the damping effect is better.

Preferably, the material of the damping column is nylon or hard rubber.

The nylon damping column has a certain elasticity and lubrication effect; Hard rubber is a highly elastic polymer material with reversible deformation. It is elastic at room temperature, and can produce greater deformation under a small external force, and can be restored to its original shape after the external force is removed.

Preferably, a sealing ring is provided at the installation position of the dual-light laser and the laser fine-tuning seat.

The sealing ring has the effect of buffering and sealing.

Preferably, the adapter is rectangular, and its size and spacing correspond to the mounting rails of gunsight devices, and is installed in conjunction with the mounting rails of the gunsight device.

Install this device on the Picatinny rail of the firearm to avoid the problem of easy loosening of the front and rear positions of sight devices when the firearm is shocked and vibrated. The dual-light laser adopts a dual-wavelength laser, which may be a dual-visible-light laser, or a visible-light and an infrared light.

The disclosure also provides a small laser, it includes a housing, a horizontal adjustment screw and a vertical adjustment screw vertically arranged on adjacent sides of the front end of the housing, and a protective glass disposed at the light exit hole at the front end of the housing, its special feature is that it also includes a horizontal damping limit post and a vertical damping limit post; The horizontal damping limit post being arranged in a first inclined damping hole that obliquely intersecting with one side of the horizontal adjustment screw; and after the horizontal damping limit post being fixed in the first inclined damping hole, the horizontal damping limit post abutting on one side of the horizontal adjustment screw, thereby a lateral extrusion limit of the horizontal adjustment screw being realized, and a rotation of the horizontal adjustment screw due to external force vibration being prevented;

The vertical damping limit post is arranged in a second inclined damping hole that obliquely intersects with one side of the vertical adjustment screw; and after the vertical damping limit post is fixed in the second inclined damping hole, it abuts on one side of the vertical adjustment screw; in this way, the lateral squeeze limit of the vertical adjustment screw is realized, and the rotation of the vertical adjustment screw due to external force vibration is prevented.

As a preferred solution, the aforementioned horizontal damping limit post and vertical damping limit post are made of nylon.

As a further optimization solution, the aforementioned protective glass is arranged obliquely to ensure that the angle between the reflective light path and the incident light path is greater than zero, to ensure that the reflective light spot does not enter the light-emitting components of the laser tube, so as to ensure the power stability of the laser output. At the same time, provide the protective glass to ensure the sealing of the laser and increase the life of the product.

The present disclosure provides a fine-tuning spring, which includes a annular spring seat provided with a gap. A first arc-shaped elastic piece and a second arc-shaped elastic piece that are arranged in two mutually perpendicular directions of the annular spring seat and extend inwardly and upwardly from the top surface of the annular spring seat;

A first limiting portion and a second limiting portion are provided on the circumference between the first arc-shaped elastic piece and the second arc-shaped elastic piece;

There are gaps between the outer sides of the first limiting portion and the second limiting portion and the first arc-shaped elastic piece and the second arc-shaped elastic piece, respectively;

The gap is centrally arranged between the first limiting portion and the second limiting portion;

The first limiting portion and the second limiting portion both extend upward from the top of the annular spring seat. In addition, the first limiting portion and the second limiting portion are provided with an upwardly extending protrusion at one end away from the gap; And a circumferential surface of the protrusion is an arc-shaped surface;

The first arc-shaped elastic piece and the second arc-shaped elastic piece are both bent in the axial direction of the annular spring seat, and spherical protrusions are provided on inner sides of top surfaces of the first arc-shaped elastic piece and the second arc-shaped elastic piece.

An inner core of a laser sight device, comprising a main body, the front end of the main body is conical, and the outer surface of the front end is a plurality of continuous inclined surfaces;

A thread groove perpendicular to the axis of the main body is provided on the two mutually perpendicular inclined surfaces respectively.

The outer surface of the tail end of the main body where the laser module is installed is a spherical surface, and a lateral limit groove is provided on the spherical surface to prevent the main body from rotating.

A laser sight device housing, an adjustment hole is opened on the circumferential side wall of the front end of the housing, and two screw holes are provided in the adjustment hole. The two screw holes are placed on the same cross section of the housing, and the outer ports of the two screw holes are adjacent, and the two screw holes are perpendicular to each other;

A limit hole is provided on the side wall of the rear end of the housing;

The side wall of the housing is provided with openings extending from back to front, and there are two openings arranged on the side walls perpendicular to each other;

The inner side wall of the housing is provided with a reset pin extending in the axial direction and a return coil spring placed in a spring hole extending in the axial direction;

The reset pin, the spring hole and a return coil spring are a set of adjusting members; There are two sets of adjusting members, the two sets of members are arranged in parallel, and each set of adjusting members is matched with a screw hole;

The reset pin is composed of a cylindrical body and a spring pusher integrally connected with the inner end of the cylindrical body;

The outer end of the cylindrical body extends toward the axial direction of the screw hole. When the screw is screwed into the screw hole, the tail end of the screw can abut the outer end of the cylindrical body, thereby squeezing the cylindrical body to make the return coil spring contract.

The cylindrical body is capsule-shaped.

The outer end of the cylindrical body is a spherical surface.

The spring pusher is composed of a central blocking member and a connecting rod fixedly connected to the front and rear ends of the blocking member;

The cross section of the blocking member is larger than the outer diameter of the return coil spring, so as to realize the pushing and blocking of the return coil spring; The cross section of the connecting rod placed at the rear end of the blocking member is smaller than the inner diameter of the return coil spring.

The reset pin is composed of a cylindrical body and a spring pusher integrally connected with an inner end of a cylindrical body;

The cylindrical body has a capsule shape or the outer end of the cylindrical body is a spherical surface.

The spring pusher is composed of a central blocking member and a connecting rod fixedly connected to the front and rear ends of the blocking member;

The cross section of the blocking member is larger than the outer diameter of the return coil spring, so as to realize the pushing and blocking of the return coil spring; The cross section of the connecting rod placed at the rear end of the blocking member is smaller than the inner diameter of the return coil spring.

A laser sight device includes a laser sight housing, a laser sight device inner core set in the laser sight device housing, and a fine-tuning spring sleeved at the end of the laser sight device inner core;

The first arc-shaped elastic piece and the second arc-shaped elastic piece are respectively inserted into the laser sight device housing from the corresponding opening. The screw hole is arranged corresponding to the thread groove, and the spherical protrusion abuts on the inclined surface opposite to the thread groove;

The protrusion is inserted into the limit hole;

By inserting the limiting block on the inner wall of the rear end of the laser sight device housing into the lateral limit groove, the laser sight device inner core prevents the laser sight inner core from rotating.

When a fine-tuning screw is screwed into the screw hole and screwed into the thread groove, the inner end of the fine-tuning screw abuts against the outer end of the reset pin, and the reset pin is squeezed inward. The front end of the reset pin abuts against the inclined surface where the thread groove is located to realize the off-axis extrusion of the inner core of the laser sight device. Then, the first arc-shaped elastic piece or the second arc-shaped elastic piece disposed on the opposite surface of the thread groove is squeezed by the inner core of the laser sight device.

When the fine-tuning screw is unscrewed, the reset pin is reset under the reaction force of the return coil spring, at the same time, the inner core of the laser sight device is reset under the reaction force of the first arc-shaped elastic piece or the second arc-shaped elastic piece.

DETAILED DESCRIPTION

The technical solutions of the present disclosure will be clearly and completely described below in conjunction with the drawings and specific embodiments. Obviously, the described embodiments are only a part of the embodiments of the present disclosure, rather than all the embodiments. Based on the embodiments of the present disclosure, all other embodiments obtained by those skilled in the art without creative work shall fall within the protection scope of the present disclosure.

Figure 1:
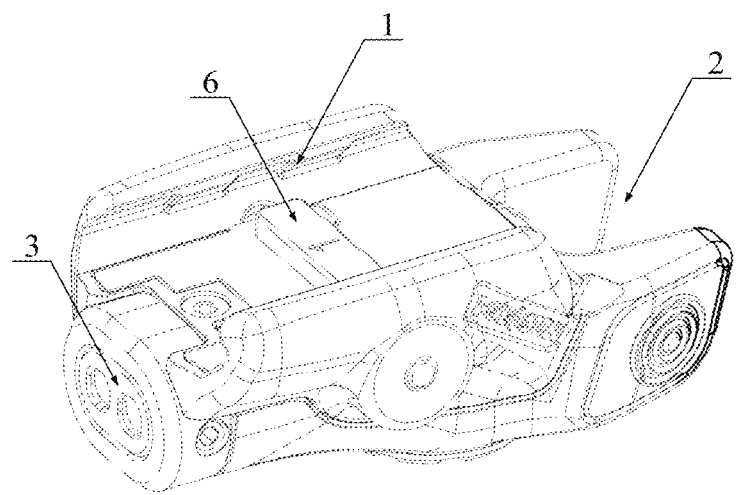
FIG. 1 is a schematic structural diagram of a fine-tuning micro gunsight with multiple types of adapters of the present disclosure.

In the description of the present disclosure, it needs to be understood that the orientation or positional relationship indicated by the terms "center, transverse, lengthwise, up, down, front, back, left, right, vertical, horizontal, top, bottom, inside, outside" etc. are based on the orientation or positional relationship shown in FIG. 1. It is only for the convenience of describing the present disclosure and simplifying the description, rather than indicating or implying that the device or element referred to must have a specific orientation, be constructed and operated in a specific orientation, and therefore cannot be understood as a limitation of the present disclosure.

Figure 2:
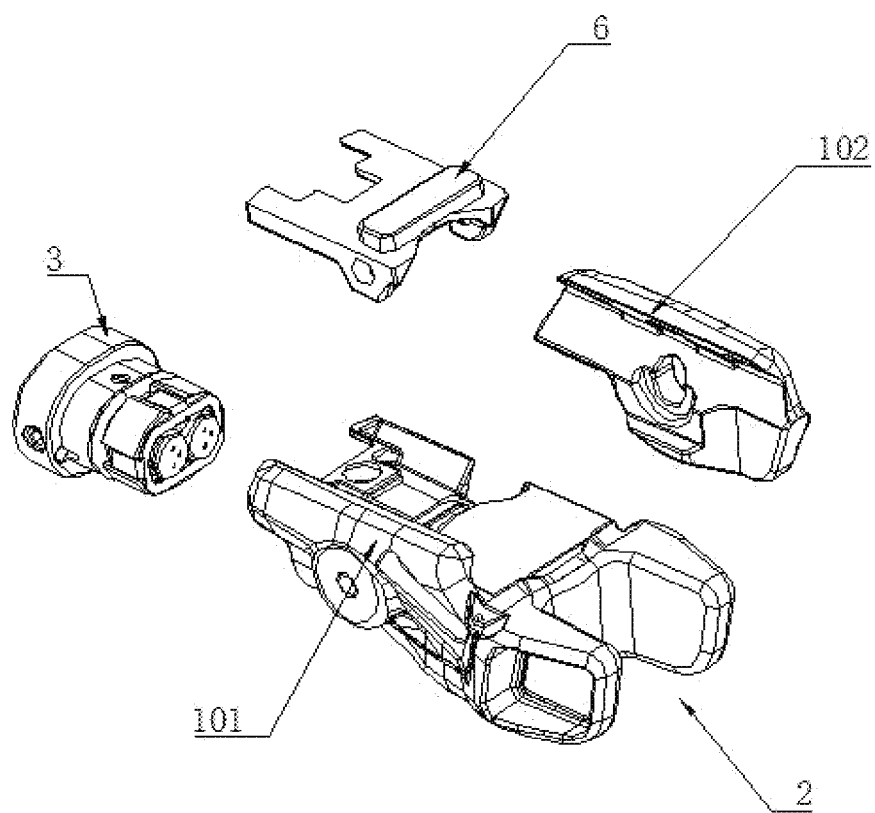
FIG. 2 is an exploded view of the structure of a fine-tuning micro gunsight with multiple types of adapters of the present disclosure.

The technical solution of the present disclosure is a micro gunsight with fine-tuning and multiple types of adapters. The schematic diagram of the structure is shown in FIG. 1, and the exploded view is shown in FIG. 2, which includes a mounting slot 1 that is matched with the gun card track. The mounting slot is composed of a fixed rail 101 and a movable rail 102. The mounting slot 1 is provided with a gunsight body 2, and inside the gunsight body 2 is provided with a laser fine-tuning seat 3. A dual-light laser 4 is installed inside the laser fine-tuning seat 3, and a fine-tuning mechanism 5 is installed in the laser fine-tuning seat 3. The adapter 6 is provided at the bottom of the gunsight body 2, and the adapter 6 is used for installation of the firearm.

On the one hand, the dual-light laser 4 is fine-tuned through the fine-tuning mechanism 5 to eliminate the error caused by the thread gap and achieve the effect of high-precision fine-tuning of the laser; On the other hand, the adapter 6 is provided at the bottom of the gunsight body 2 to install the present device on the Picatinny rail of the firearm, so as to avoid the problem of easy loosening of the front and rear positions of the sight device during vibration and impact of the firearm.

The adapter 6 is rectangular, and its size and spacing correspond to the mounting rails of different gun sight devices, and is installed in conjunction with the mounting rail of the gun sight device. According to the requirements of the mounting rails of different firearms and sight devices, the appropriate shape, size, quantity and spacing of the adapter 6 are selected. The micro gunsight can be used in a variety of light weapon attachment occasions, and its application range is wider.

The installation position of the dual-light laser 4 and the laser fine-tuning seat 3 is provided with a sealing ring 12. Because the firearm has a large impact and vibration during use, the sealing ring 12 plays a certain buffering effect and improves the sealing performance.

Figure 3:
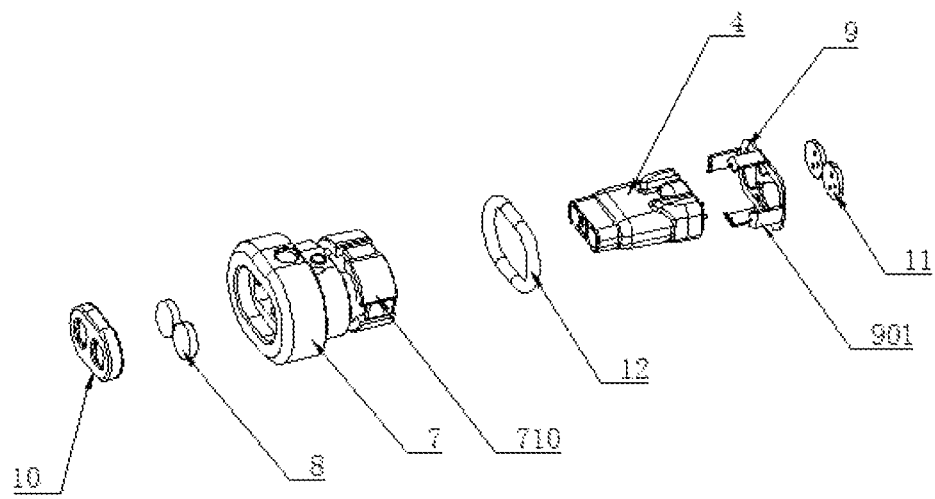
FIG. 3 is an exploded schematic diagram of the laser fine-tuning seat of the present disclosure.

An exploded view of the structure of the laser fine-tuning seat 3 is shown in FIG. 3. The laser fine-tuning seat 3 includes a fine-tuning member 7 arranged on the periphery of the dual-light laser 4. The front end of the fine-tuning member 7 is the light-emitting end of the dual-light laser 4, the front end of the fine-tuning member 7 is provided with a protective glass 8, and the rear end of the fine-tuning member 7 is provided with a back cover 9;

A lens holder 10 is provided on the outer periphery of the protective glass 8. The lens holder 10 enables the protective glass 8 in a safe working state. The protective glass 8 is arranged obliquely, and the protective glass 8 is inclined at a certain angle to prevent the laser light from being reflected back to the laser tube in the original way and causing the power of the dual-light laser 4 to be unstable.

The back cover 9 is a spring back cover, and the spring is an L-shaped spring 901. The rear periphery of the fine-tuning member 7 is provided with bump 710. The L-shaped spring 901 is clamped with the bump 710, and the back cover 9 is provided with a laser drive plate 11; The back cover 9 keeps the fine-tuning member 7 from dust and improves the precision. The setting of the L-shaped spring 901 makes the back cover 9 easy to open or close.

Figure 5:
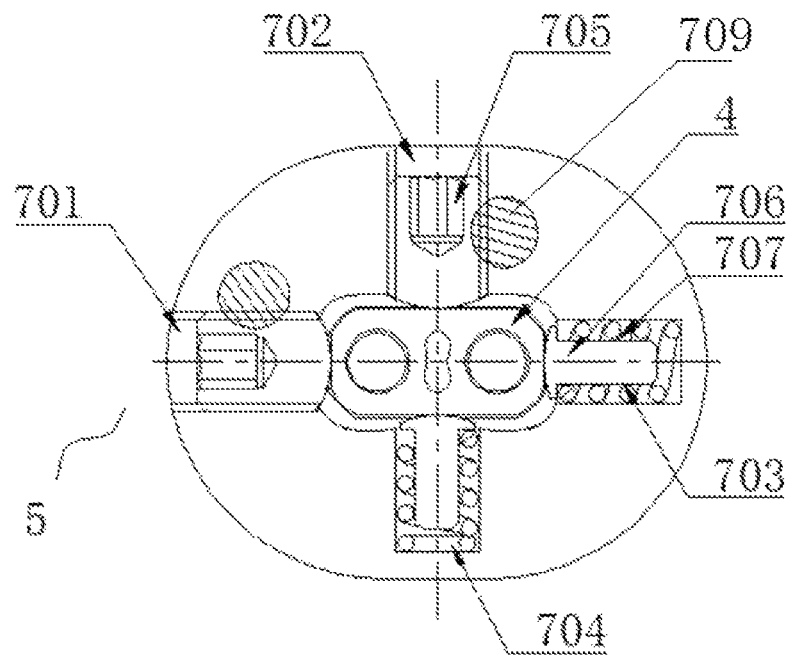
FIG. 5 is a front cross-sectional view of the fine-tuning mechanism of the present disclosure.
Figure 6:
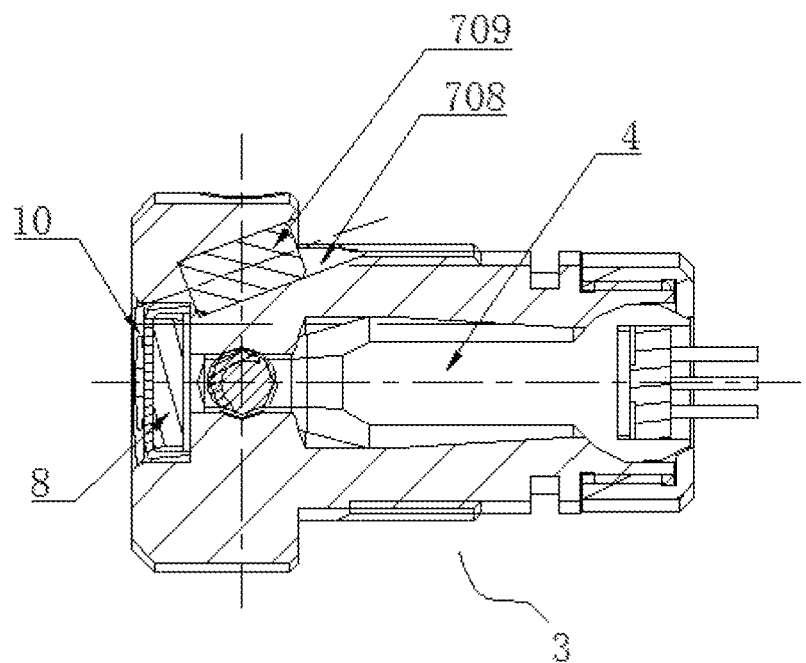
FIG. 6 is a side cross-sectional view of the fine-tuning mechanism of the present disclosure.

The front sectional view of the fine-tuning mechanism 5 is shown in FIG. 5, and the side sectional view is shown in FIG. 6. The fine-tuning mechanism 5 includes a first fine-tuning hole 701, a second fine-tuning hole 702, a third fine-tuning hole 703, and a fourth fine-tuning hole 704 evenly arranged on the same cross-section of the fine-tuning member 7. The first fine-tuning hole 701 is arranged opposite to the third fine-tuning hole 703, and the second fine-tuning hole 702 is arranged opposite to the fourth fine-tuning hole 704. The first fine-tuning hole 701 and the second fine-tuning hole 702 are threaded holes, and are respectively provided with a fine-tuning screw 705. The third fine-tuning hole 703 and the fourth fine-tuning hole 704 are blind holes, and a guide post 706 is provided inside, and a return spring 707 is provided outside the guide post 706.

The side surfaces of the first fine-tuning hole 701 and the second fine-tuning hole 702 are respectively provided with a damping hole 708 obliquely penetrated therethrough. The damping hole 708 is provided with a damping column 709 which is in contact with the fine-tuning screw 705.

The dual-light laser 4 is fine-tuned by the fine-tuning screw 705 and the return spring 707, and then the error caused by the thread gap is eliminated by the fine-tuning damping column 709, and the effect of high-precision fine-tuning of the dual-light laser 4 is achieved.

Figure 4:
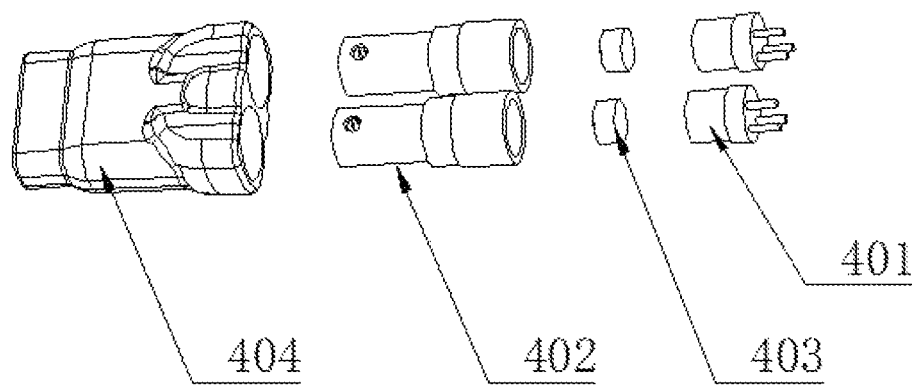
FIG. 4 is an exploded schematic diagram of the dual-light laser of the present disclosure.

The exploded view of the structure of the dual-light laser 4 is shown in FIG. 4. The dual-light laser 4 includes two laser tubes 401, the laser tubes 401 are coaxially installed in the coaxial housings 402, and the light-emitting end of the laser tubes 401 are provided with focusing lens 403. The outer periphery of the coaxial housings 402 are provided with fine-tuning housing 404. The light-emitting end of the fine-tuning housing 404 is set as a rectangle, and the four sides of the rectangle are respectively arranged perpendicular to the four fine-tuning holes of the fine-tuning member 7. The light-emitting end of the dual-light laser 4 is set to be rectangular, and the front end of the corresponding fine-tuning member 7 is set to be a rectangular ring. The fine-tuning member 7 and the rectangular of the dual-light laser 4 are in a clearance fit, so that the dual-light laser 4 can achieve a fine-tuning effect in the gap along with the fine-tuning of the fine-tuning screw 705 on the fine-tuning member 7.

The cross section of the light-emitting end of the dual-light laser 4 is rectangular, and the four sides of the rectangle are respectively arranged perpendicular to the four fine-tuning holes of the fine-tuning member 7. Setting the cross section of the light-emitting surface of the dual-light laser 4 to be rectangular makes it easier for the four fine-tuning holes to fine-tune the dual-light laser 4, and the four fine-tuning holes are arranged perpendicular to the four cross-sections of the rectangular, making the fine-tuning more accurate and easy to operate.

The fine-tuning damping hole 708 and the fine-tuning damping column 709 are a transitional fit. The fine-tuning damping column 709 is made of elastic non-metallic materials such as nylon or rubber. The squeezing action of the fine-tuning screw causes the fine-tuning damping column to deform, so that the fine-tuning damping column is not easy to fall off. The fine-tuning damping column 709 made of nylon has a certain elasticity and lubricating effect, and the rubber is a highly elastic polymer material with reversible deformation. It is elastic at room temperature, can produce large deformation under a small external force, and can return to its original state after removing the external force. The fine-tuning damping column 709 is in contact with the fine-tuning screw 705. When the fine-tuning screw 705 is fine-tuned, under the action of the fine-tuning damping column 709, the fine-tuning screw 705 is always close to the front end of the internal threaded hole of the fine-tuning screw 705 on the fine-tuning member 7, thereby eliminating the error caused by the thread gap and achieving the effect of high-precision fine-tuning of the dual-light laser 4.

The movable rail 102 and the gunsight body 2 are connected by a locking screw, and the movable rail 102 is flexibly arranged, which makes the installation and disassembly of the miniature gunsight flexible. The laser fine-tuning seat 3 is provided with internal threads, and the gunsight body 2 and the laser fine-tuning seat 3 are connected by countersunk screws. The use of the countersunk screws does not affect the installation of the adapters 6 and is meanwhile more beautiful.

The laser tubes 401 of the dual-light laser 4 can be a combination of the same kind of laser tubes or a combination of different kinds of laser tubes. When the laser tubes 401 are a combination of a visible light laser tube and an infrared light laser tube, a visible light switch button, an infrared switch button, a key board and a main board can be set on the gunsight body 2. At the same time, a battery box and the like is arranged on the gunsight body 2.

Working process: first, the preparatory work before installing the dual-light laser 4 is to install the protective glasses 8 into the lens holder 10 obliquely, and then install the lens holder 10 into the fine-tuning member 7; The return spring 707 is sleeved on the outer circumference of the guide post 706, and then put into the third fine-tuning hole 703 and the fourth fine-tuning hole 704.

For the combined installation of the dual-light laser 4, two laser tubes 401 are coaxially installed in the coaxial housings 402, the light-emitting end of the laser tubes 401 are equipped with focusing lens 403, and the coaxial housings 402 are coaxially installed inside the fine-tuning housing 404. The dual-light laser 4 adopts a dual-wavelength laser, which may be a dual-visible-light laser, or a visible-light+ infrared light.

According to the requirements of the mounting card tracks of different gun sight devices, select the appropriate shape, size, number and spacing of the adapter 6 corresponding to the mounting card tracks of the sight devices. The multiple types of adapters can be installed in conjunction with different sight mounting rails, which are also suitable for Picatinny rails of different specifications of firearms, so that the installation position is convenient to operate by the user. Install the adapter 6 on the bottom of the gunsight body 2.

Secondly, install the dual-light laser 4 coaxially with the laser fine-tuning seat 3, and extend the rectangle of the light-emitting end of the dual-light laser 4 into the fine-tuning member 7. The four sides of the rectangle are respectively arranged perpendicular to the four fine-tuning holes of the fine-tuning member 7.

Third, screw the fine-tuning screws 705 into the first fine-tuning hole 701 and the second fine-tuning hole 702, and put the fine-tuning damping column 709 into the fine-tuning damping hole 708. In addition, the fine-tuning damping column 709 is brought into contact with the fine-tuning screw 705. The position and direction of the dual-light laser 4 are fixed, and then the back cover 9 is installed.

Finally, the miniature gunsight is installed on the target firearm card track through the adapter 6 and the mounting slot 1, and then the fine-tuning screws 705 are fine-tuned according to the emission requirements of the dual-light laser 4 to realize the high-precision fine-tuning of the laser fine-tuning fixing device.

In summary, in order to solve the fine-tuning of the dual-light laser used in the gun in the prior art, due to the thread gap of the fine-tuning screw; there is a certain error, the accuracy is not easy to control, and the effect of high-precision fine-tuning cannot be achieved; In addition, the existing laser sight device has the problem of loose front and rear positions in the Picatinny rail; In the present disclosure, on the one hand, the laser is fine-tuned through the fine-tuning screw and the return spring, and then the error caused by the thread gap is eliminated through the damping column to achieve the effect of high-precision fine-tuning of the laser; On the other hand, the adapter is provided at the bottom of the gunsight body 2 to install the present device on the Picatinny rail of the firearm, so as to avoid the problem of easy loosening of the front and rear positions of the sight device during vibration and impact of the firearm.

Figure 7:
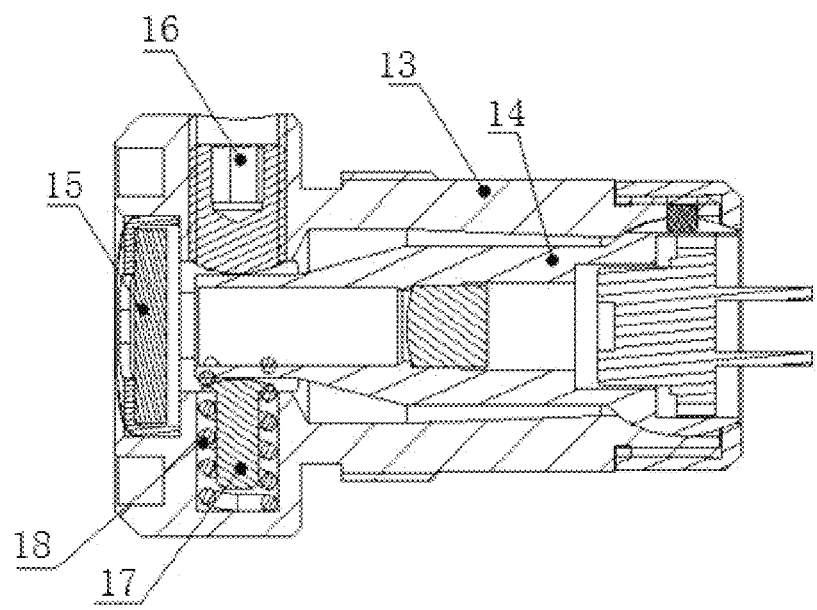
FIG. 7 is an axial cross-sectional view of an existing small laser.

Based on the technical concept adopted in the foregoing embodiments regarding the fine-tuning of the limit to prevent loosening due to vibration, in order to overcome the problem that the accuracy of the sight device is adversely affected due to vibration or reflection during the use of existing laser sight devices, especially small laser sight devices, this embodiment provides a small laser as shown in FIGS. 8, 9, 10 and 11. It includes the housing 13, the horizontal adjustment screw 16 and the vertical adjustment screw 23 vertically arranged on the adjacent side surfaces of the front end of the housing 13, and the protective glass 15 arranged at the light exit hole at the front end of the housing 13 shown in FIG. 7. The difference from FIG. 7 is that in this embodiment, in order to ensure the stability of the horizontal adjustment screw 16 and the vertical adjustment screw 23 during use, a first inclined damping hole 26 that obliquely intersects one side of the horizontal adjustment screw 16 is disposed on the rear side of the front end of the housing 13 shown in FIG. 8. After a horizontal damping limit post 25 is fixed in the first inclined damping hole 26, it abuts on one side of the horizontal adjustment screw 16, thereby realizing the lateral compression limit of the horizontal adjustment screw 16. The horizontal adjustment screw 16 is prevented from being loosened due to the rotation of the external force vibration, thereby ensuring the stability of the left and right angles of the laser module 14 and helping to ensure the guarantee of its accuracy and reliability.

Figure 8:
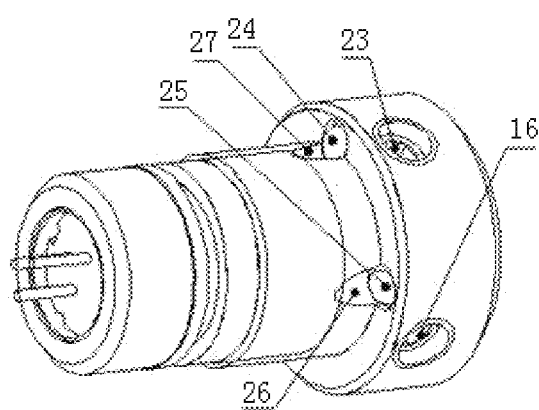
FIG. 8 is a perspective view of a small laser provided by an embodiment.
Figure 9:
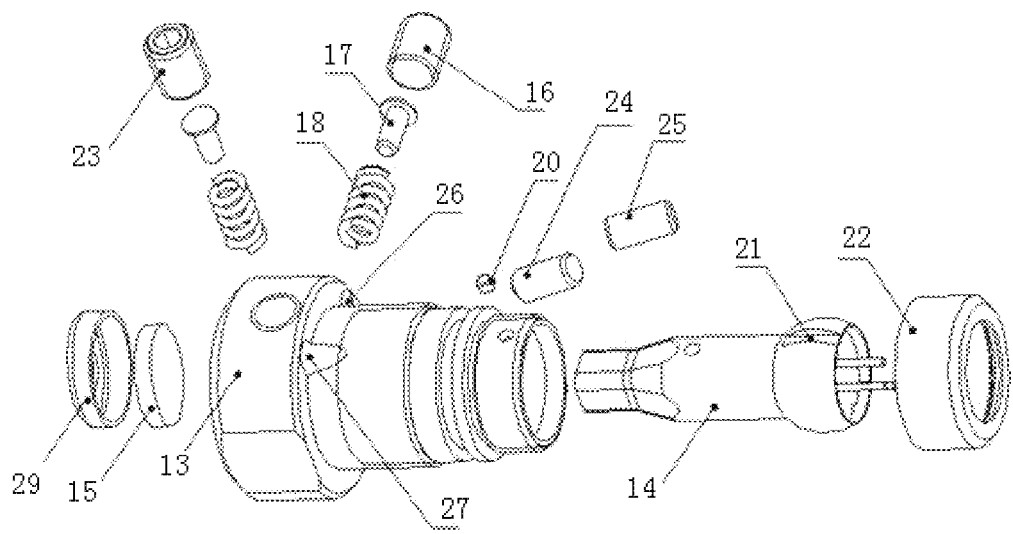
FIG. 9 is an exploded view of an existing small laser provided by an embodiment.
Figure 10:
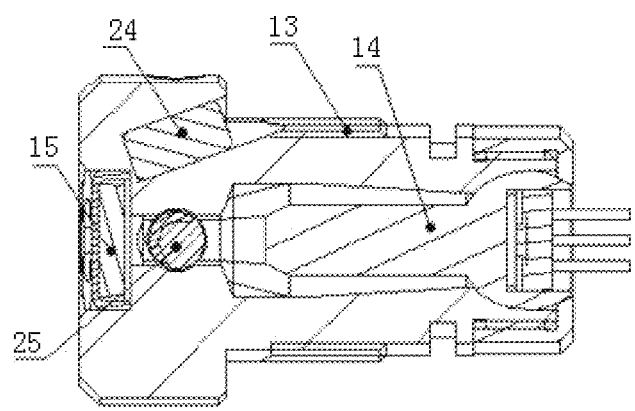
FIG. 10 is an axial cross-sectional view of a small laser provided by an embodiment.
Figure 11:
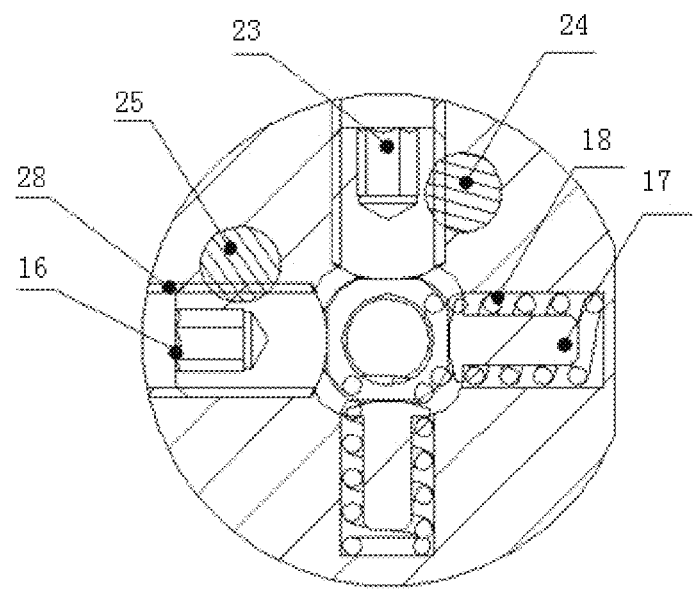
FIG. 11 is a cross-sectional view of a small laser provided by an embodiment.

In order to ensure the stability of the vertical adjustment screw 23 during use, a second inclined damping hole 27 intersecting the vertical adjustment screw 23 obliquely is provided on the rear side of the front end of the housing 13 shown in FIG. 8. A vertical damping limit post 24 is arranged in the second inclined damping hole 27, and after the vertical damping limit post 24 is fixed in the second inclined damping hole 27, it abuts against one side of the vertical adjustment screw 23. In this way, the lateral squeeze limit of the vertical adjustment screw 23 is realized, the vertical adjustment screw 23 is prevented from rotating due to external force vibration, and the vertical adjustment screw 23 is prevented from being loosened due to the rotation of external force vibration. Therefore, the stability of the pitch angle of the laser module 14 is ensured, which is beneficial to ensure the guarantee of the accuracy and reliability of its use.

In this embodiment, the horizontal damping limit post 25 and the vertical damping limit post 24 are arranged to resist the stabilized horizontal adjustment screw 16 and the vertical adjustment screw 23 from the inclined side, which effectively prevents the horizontal adjustment screw 16 and the vertical adjustment screw 23 from loosening due to external vibration, and helps ensure the stability and accuracy of the small laser.

Among them, the horizontal damping limit post 25 and the vertical damping limit post 24 are made of nylon material, which has good elastic deformation. Relying on the elasticity of the horizontal damping limit post 25 and the vertical damping limit post 24, they can press on the horizontal adjustment screw 16 and the vertical adjustment screw 23 to achieve positioning.

Figure 12:
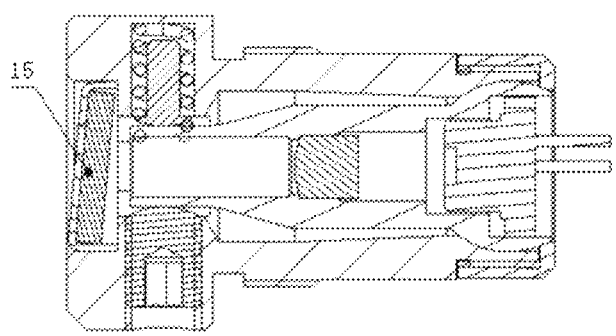
FIG. 12 is a schematic diagram with the protective glass obliquely arranged.

In view of the fact that most of the protective glass in the existing lasers are arranged perpendicular to the axis of the housing or the optical axis of the emitted light, the power of the emitted light is attenuated due to the reflected light returned from the original path, and the power of the light actually emitted outside the protective glass is attenuated. In this embodiment, the protective glass 15 is arranged obliquely (see FIG. 12) to ensure that the angle between the reflective light path and the incident light path is greater than zero. This effectively avoids the defect that the reflected light and the incident light incident on the protective glass overlap and the direction is opposite to cause the actual outgoing light power to decrease. Ensure that the reflective light spot will not be reflected back to the photoelectric sensor in the laser tube, and causing the problem of poor output power stability, so as to ensure the power stability of the laser output. At the same time, provide the protective glass to ensure the sealing of the laser and increase the product life.

In summary, it is not difficult to see that by adding a horizontal damping limit post or a vertical damping limit post that cross-interference with the horizontal adjustment screw or the vertical adjustment screw; relying on the elastic deformation of the horizontal damping limit post and the vertical damping limit post to realize the resistance to the horizontal adjustment screw or the vertical adjustment screw; Thereby tightening the contact force or fixing stability of the horizontal adjustment screw or the vertical adjustment screw and the screw holes, improve the seismic performance, and ensure the use stability of the horizontal adjustment screw or the vertical adjustment screw; At the same time, by arranging the protective glass obliquely, it is avoided that the reflected light returns along the optical path of the incident light (the light incident on the protective glass, that is the output light of the sight device) and the output light power of the sight device is reduced.

It's important to note that the design principle and structure or function or effect of the first inclined damping hole 26, the second inclined damping hole 27, the vertical damping limit post 24 and the horizontal damping limit post 25 involved in the embodiment of the small laser are the same as those of the damping hole 708 and the damping post 709 in the embodiment of the micro gunsight. Eliminate the screw gap and effectively prevent loosening.

Figure 13:
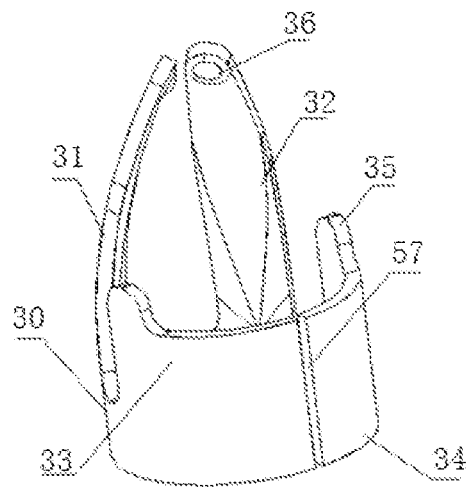
FIG. 13 is a view of the side where the fine-tuning spring is provided with a gap.

In order to ensure the stability of high-precision adjustment of small angles, this embodiment provides a fine-tuning spring as shown in FIG. 13. It includes an annular spring seat 30 provided with a gap 57, a first arc-shaped elastic piece 31 and a second arc-shaped elastic piece 32 arranged in two mutually perpendicular directions of the annular spring seat 30 and inclined inwardly and upwardly extending from the top surface of the annular spring seat 30, to ensure the continuity and balance of the force when adjusting the angle of the inner core of the laser.

Where, a first limiting portion 33 and a second limiting portion 34 are provided on the circumference between the first arc-shaped elastic piece 31 and the second arc-shaped elastic piece 32; There are gaps 37 between the outer sides of the first limiting portion 33 and the second limiting portion 34 and the first arc-shaped elastic piece 31 and the second arc-shaped elastic piece 32, respectively; The gap 57 is centrally arranged between the first limiting portion 33 and the second limiting portion 34. The gap 57 mainly leaves enough room for expansion and contraction of the fine-tuning spring, which is a general technique.

Figure 14:
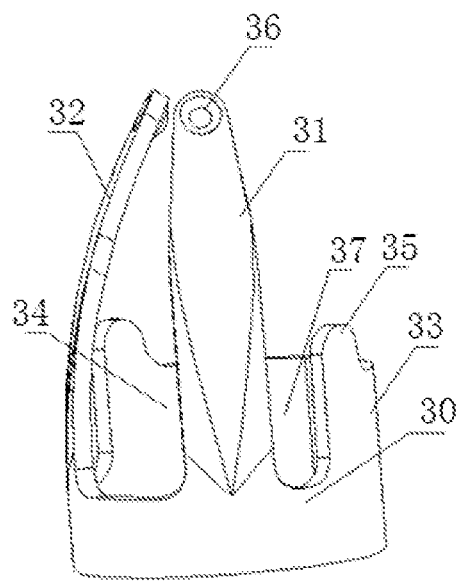
FIG. 14 is a north side view of the first arc-shaped elastic piece and the second arc-shaped elastic piece of the fine-tuning spring.
Figure 15:
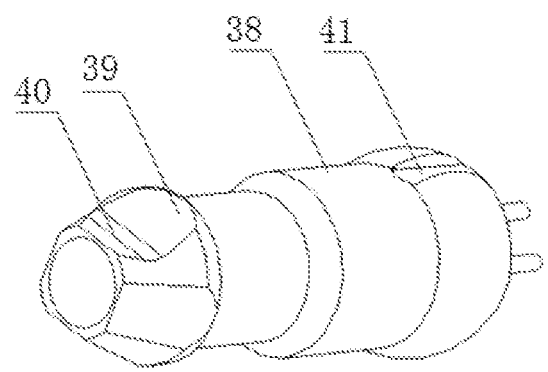
FIG. 15 is a schematic diagram of the inner core structure of the laser sight device.
Figure 16:
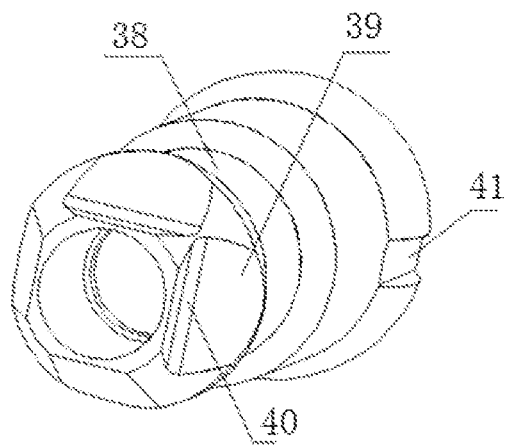
FIG. 16 is the second schematic diagram of the inner core structure of the laser sight device.
Figure 17:
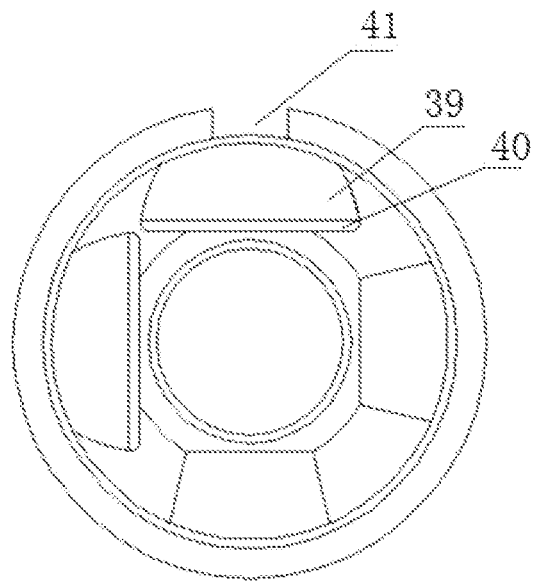
FIG. 17 is a front end view of the inner core of the laser sight device.
Figure 18:
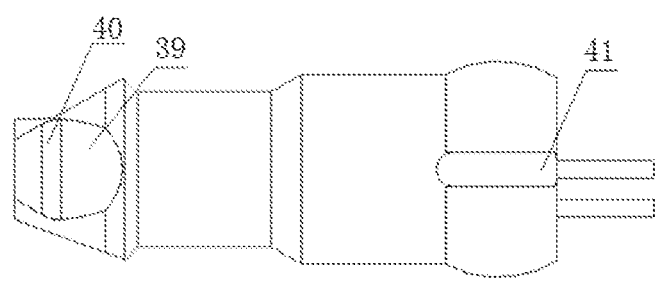
FIG. 18 is a side view of the inclined surface side of the thread groove of the inner core structure of the laser sight device.
Figure 19:
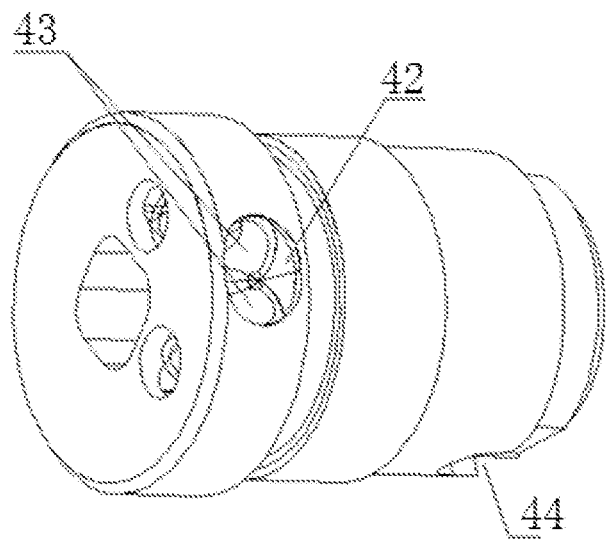
FIG. 19 is a schematic diagram of the housing structure of the laser sight device
Figure 20:
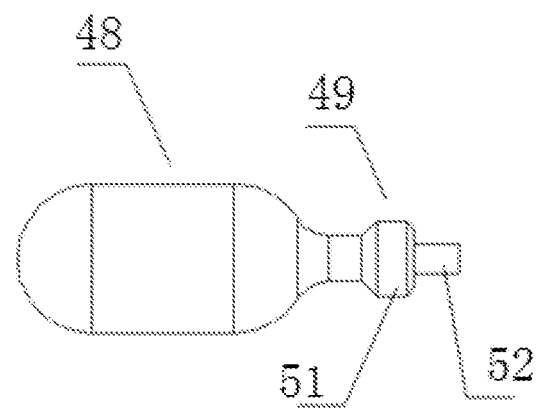
FIG. 20 is a side view of the reset pin.
Figure 21:
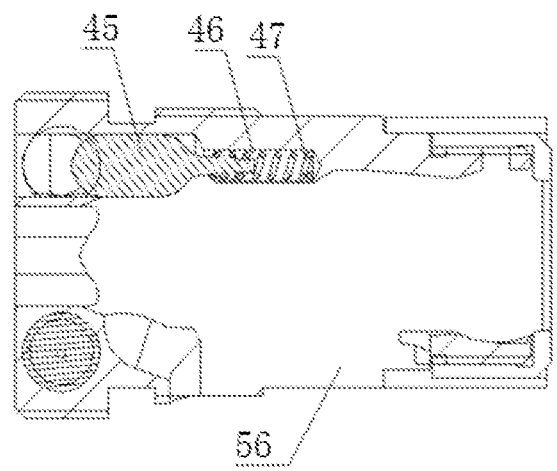
FIG. 21 is an axial cross-sectional view of the laser sight device housing.

It can be seen from FIG. 14 that the first limiting portion 33 and the second limiting portion 34 both extend upward from the top of the annular spring seat 30. In addition, the first limiting portion 33 and the second limiting portion 34 are provided with an upwardly extending protrusion 35 at one end away from the gap 57; And the circumferential surface of the protrusion 35 is an arc-shaped surface, that is, the cross-section is an arc-shaped surface.

Both the first arc-shaped elastic piece 31 and the second arc-shaped elastic piece 32 are bent in the axial direction of the annular spring seat 30. Moreover, the inner sides of the top surfaces of the first arc-shaped elastic pieces 31 and the second arc-shaped elastic pieces 32 are both provided with spherical protrusions 36, to resist the extruded part, and at the same time use the spherical protrusion to improve the sensitivity of the operation, and to avoid the interference caused by the large-area contact.

At the same time, this embodiment provides another inner core of the laser sight device shown in FIG. 15 to FIG. 18. It includes a main body 38, the front end of the main body 38 is conical, and the outer surface of the front end is a plurality of continuous inclined surfaces 39; A thread groove 40 perpendicular to the axis of the main body 38 is provided on the two mutually perpendicular inclined surfaces respectively.

The outer surface of the rear end of the main body 38 where the laser module is installed is a spherical surface, and a lateral limit groove 41 is provided on the spherical surface to prevent the main body 38 from rotating when the angle is adjusted, thereby affecting accuracy and stability.

This embodiment also provides a laser sight device housing as shown in FIG. 19 to FIG. 22. An adjustment hole 42 is opened on the circumferential side wall of the front end of the housing, and two screw holes 43 are provided in the adjustment hole 42. The two screw holes 43 are placed on the same cross section of the housing, and the outer ports of the two screw holes 43 are adjacent, and the two screw holes 43 are perpendicular to each other; A limit hole 44 is provided on the side wall of the rear end of the housing; The side wall of the housing is provided with openings 56 extending from back to front, and there are two openings 56 arranged on the side walls perpendicular to each other; The inner side wall of the housing is provided with a reset pin 45 extending in the axial direction and a return coil spring 47 placed in a spring hole 46 extending in the axial direction; The reset pin 45, the spring hole 46 and a return coil spring 47 are a set of adjusting members; There are two sets of adjusting members, the two sets of members are arranged in parallel, and each set of adjusting members is matched with a screw hole 43; The reset pin 45 is composed of a cylindrical body 48 and a spring pusher 49 integrally connected with the inner end of the cylindrical body 48; The outer end of the cylindrical body 48 extends toward the axial direction of the screw hole 43. When the screw 50 is screwed into the screw hole 43, the tail end of the screw 50 can abut the outer end of the cylindrical body 48, thereby squeezing the cylindrical body 48 to make the return coil spring 47 contract.

The cylindrical body 48 has a capsule shape or the outer end of the cylindrical body 48 is a spherical surface.

Where, the spring pusher 49 is composed of a central blocking member 51 and a connecting rod 52 fixedly connected to the front and rear ends of the blocking member 51; The cross section of the blocking member 51 is larger than the outer diameter of the return coil spring 47, so as to realize the pushing and blocking of the return coil spring 47; The cross section of the connecting rod 52 placed at the rear end of the blocking member 51 is smaller than the inner diameter of the return coil spring 47.

The reset pin is characterized in that it is composed of a cylindrical body 48 and a spring pusher 49 integrally connected with the inner end of the cylindrical body 48;

The cylindrical body 48 has a capsule shape or the outer end of the cylindrical body 48 is a spherical surface.

Figure 23:
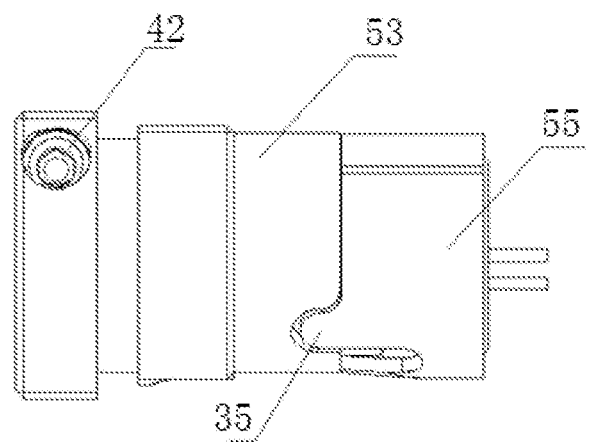
FIG. 23 is an overall side view of the laser sight device.
Figure 24:
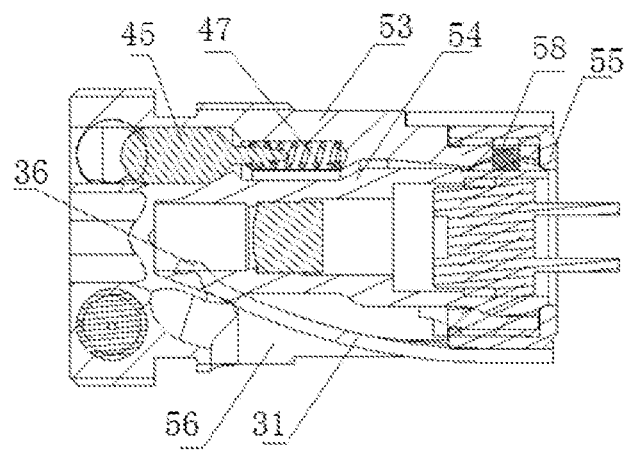
FIG. 24 is an axial cross-sectional view of the laser sight device.
Figure 25:
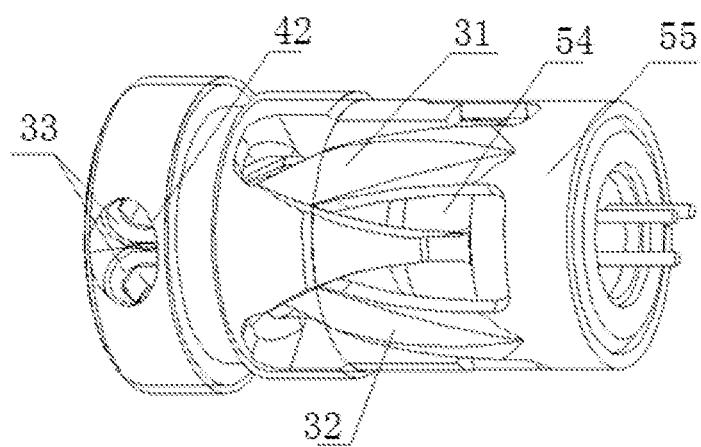
FIG. 25 is a perspective view of a laser sight device.

Based on the above main components, this embodiment provides a laser sight device as shown in FIGS. 23 to 25. It includes the aforementioned laser sight device housing 53, the aforementioned laser sight device inner core 54 arranged in the laser sight device housing, and a fine-tuning spring 55 sleeved at the end of the laser sight device inner core 54.

The specific assembly is: the first arc-shaped elastic piece 31 and the second arc-shaped elastic piece 32 are respectively inserted into the laser sight device housing 53 from the corresponding opening 56. The screw hole 43 is arranged corresponding to the thread groove 40, and the spherical protrusion 36 abuts on the inclined surface 39 opposite to the thread groove 40; The protrusion 35 is inserted into the limit hole 44; By inserting the limiting block 58 on the inner wall of the rear end of the laser sight device housing 53 into the lateral limit groove 41, the laser sight device inner core 54 prevents the laser sight inner core 54 from rotating.

When a fine-tuning screw is screwed into the screw hole 43 and screwed into the thread groove 40, the inner end of the fine-tuning screw abuts against the outer end of the reset pin 45, and the reset pin 45 is squeezed inward. The front end of the reset pin 45 abuts against the inclined surface where the thread groove 40 is located to realize the off-axis extrusion of the inner core 54 of the laser sight device. Then, the first arc-shaped elastic piece 31 or the second arc-shaped elastic piece 32 disposed on the opposite surface of the thread groove 40 is squeezed by the inner core 54 of the laser sight device.

When the fine-tuning screw is unscrewed, the reset pin 45 is reset under the reaction force of the return coil spring 47, at the same time, the inner core 54 of the laser sight device is reset under the reaction force of the first arc-shaped elastic piece 31 or the second arc-shaped elastic piece 32.

Figure 22:
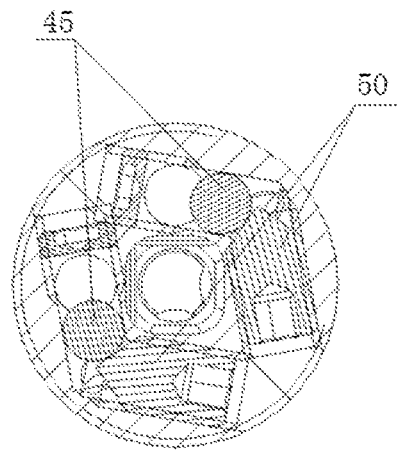
FIG. 22 is a cross-sectional view of the front end of the laser sight device housing.

The process of adjusting the angle of the laser sight device to the inner core of the laser sight device, that is, the emitted laser light: The screw 50 shown in FIG. 22 is screwed in or out of the screw hole 43 and then screwed in or out of the thread groove 40. The tail end of the screw 50 abuts against the cylindrical body 48 of the reset pin 45, and squeezes the reset pin inward so that the inner end of the cylindrical body 48 abuts on the inclined surface 39 where the thread groove 40 is located. It realizes the downward (upward) or leftward (rightward) extrusion of the inner core 54 of the laser sight device to complete the adjustment of the laser emission angle. During the entire adjustment process, the first arc-shaped elastic piece 31 and the second arc-shaped elastic piece 32 slowly deviate from the axis when they are squeezed. When the external force is withdrawn, force is applied to the inclined surface (the inclined surface without the thread groove and opposite to the inclined surface with the thread groove) in contact with them to realize the reset of the laser sight device inner core 54.

In the description of this specification, the description with reference to the terms "one embodiment", "example", "specific example", etc. means that the specific feature, structure, material, or characteristic described in conjunction with the embodiment or example is included in at least one embodiment or example of the present disclosure. In this specification, the schematic representations of the above-mentioned terms do not necessarily refer to the same embodiment or example. Moreover, the described specific features, structures, materials or characteristics can be combined in any one or more embodiments or examples in a suitable manner.

The preferred embodiments of the present disclosure disclosed above are only used to help illustrate the present disclosure. The preferred embodiments do not describe all the details in detail, nor do they limit the disclosure to only specific implementations. Obviously, many modifications and changes can be made according to the content of this specification. This specification selects and specifically describes these embodiments in order to better explain the principles and practical applications of the present disclosure, so that those skilled in the art can understand and use the present disclosure well. The present disclosure is only limited by the claims and their full scope and equivalents.

What is claimed is:

1. A fine-tuning micro gunsight comprising a mounting slot matched with a gun rail, the mounting slot being composed of a fixed rail and a movable rail, and a gunsight body being provided on the mounting slot, the gunsight body being provided with a laser fine-tuning seat inside, a dual-light laser being installed inside the laser fine-tuning seat, wherein the laser fine-tuning seat is provided with a fine-tuning mechanism;

an adapter being provided at the bottom of the gunsight body, the adapter comprising different types of adapters, and the different types of adapters being installed and used in conjunction with different rails of different firearms;

wherein the laser fine-tuning seat comprises a fine-tuning member arranged on the outer periphery of the dual-light laser, a front end of the fine-tuning member is a light-emitting end of the dual-light laser, the front end of the fine-tuning member is provided with protective glasses, and a rear end of the fine-tuning member is provided with a back cover;

the fine-tuning mechanism includes a first fine-tuning hole, a second fine-tuning hole, a third fine-tuning hole, and a fourth fine-tuning hole evenly arranged on a same cross-section of the fine-tuning member, the first fine-tuning hole is arranged opposite to the third fine-tuning hole, and the second fine-tuning hole is arranged opposite to the fourth fine-tuning hole, the first fine-tuning hole and the second fine-tuning hole are threaded holes, and are respectively provided with a fine-tuning screw, the third fine-tuning hole and the fourth fine-tuning hole are blind holes, and a guide post is provided inside, and a return spring is provided on the outside of the guide post; and wherein side surfaces of the first fine-tuning hole and the second fine-tuning hole are respectively provided with a damping hole obliquely penetrated therethrough, the damping hole is provided with a damping column which is in contact with the fine-tuning screw.

2. The fine-tuning micro gunsight of claim 1, wherein the dual-light laser comprises two laser tubes, the laser tube is coaxially installed in a coaxial housing, and a light-emitting end of the laser tube is provided with a focusing lens, an outer periphery of the coaxial housing is provided with a fine-tuning housing.

3. The fine-tuning micro gunsight of claim 2, wherein a light-emitting end of the fine-tuning housing is set as a rectangle, and four sides of the rectangle are respectively arranged perpendicular to four fine-tuning holes of the fine-tuning member.

4. The fine-tuning micro gunsight of claim 1, wherein a lens holder is provided on an outer periphery of the protective glass, and the protective glass is arranged obliquely.

5. The fine-tuning micro gunsight of claim 1, wherein the back cover is a spring back cover, the spring is an L-shaped spring, and a bump is provided on an outer periphery of a rear part of the fine-tuning member, the L-shaped spring is clamped with the bump, and the back cover is provided with a laser drive plate.

6. The fine-tuning micro gunsight of claim 1, wherein the damping column and the damping hole are transitional fits.

7. The fine-tuning micro gunsight of claim 1, wherein a material of the damping column is nylon or hard rubber.

8. The fine-tuning micro gunsight of claim 1, wherein a sealing ring is provided at a mounting position of the dual-light laser and the laser fine-tuning seat.

9. The fine-tuning micro gunsight of claim 1, wherein the adapter is rectangular, and its size and spacing correspond to a sight device mounting rail, and are installed in cooperation with the sighting device mounting rail;

the dual-light laser adopts a dual-wavelength laser, which may be a dual-visible-light laser, or a visible-light and an infrared light.

* * * * *